Feb. 11, 1958     T. H. LITTLE     2,823,126
METHOD OF PRODUCING JUICES FROM VEGETABLES INCLUDING FRUITS
Filed Jan. 3, 1956     2 Sheets-Sheet 1

INVENTOR.
THOMAS H. LITTLE
BY Hugo G. Feminan
ATTORNEY

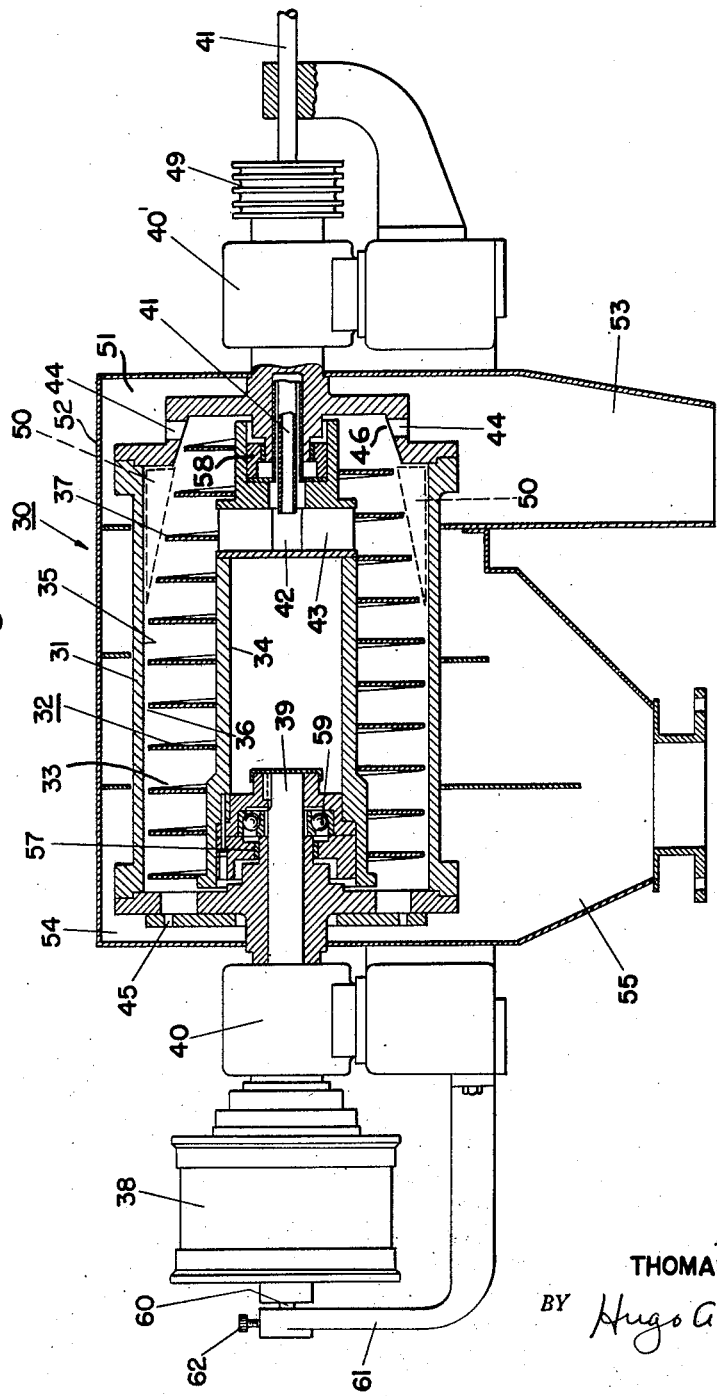

United States Patent Office 2,823,126
Patented Feb. 11, 1958

2,823,126

METHOD OF PRODUCING JUICES FROM VEGETABLES INCLUDING FRUITS

Thomas H. Little, Strafford, Pa., assignor to The Sharples Corporation, a corporation of Delaware Application January 3, 1956, Serial No. 557,085

7 Claims. (Cl. 99—105)

This invention pertains generally to the production in a continuous manner of juice from vegetables, and particularly to the recovery, in improved yield, of juice substantially free from suspended solid matter.

In the production of juice from vegetables, various preliminary treatments are customarily employed in the art such as washing of the vegetables to remove dirt, leaves, etc., removal of stems when present, such as in the case of grapes, removal of rinds when present, etc. The vegetables are then subjected to a crushing or other disintegrating operation, the degree depending upon the particular vegetable undergoing treatment.

In the case of grapes, for example, the crushing is frequently done by passing the grapes between rolls so spaced from each other as to hardly more than break the skin of the grape, and to release or detach the stems. This is followed by removal of the stems. The mass is then usually subjected to a depectinizing treatment, unless the grapes have been previously frozen, in which case the addition to the grapes of a depectinizing agent, for example a pectinolytic enzyme, is usually unnecessary, for at the low temperatures of freezing the pectin originally present is apparently changed to an extent sufficient so that it does not exhibit its normal properties.

The grape mass is usually then heated, for example, to between 135 and 140° F., for a period of time to accelerate the release of juice from the solids and of color from the skins, as well as the action of the pectinolytic enzyme, if present.

The mass is now ready for the separation of the solids from the juice, and of the residual juice from the solids. Both operations present extremely difficult problems when it is desired to operate efficiently in a continuous manner, particularly in view of the marked proclivity of finely divided solids to remain suspended, or to become resuspended, in the juice. Also, the difficulties encountered in attempting to continuously press the solids with sufficient force to reduce the residual juice content thereof to a desired low figure have been distressing. The solids are usually of such a slippery, mushy or slimy character as to effectively resist the application of relatively high force to a continuously moving mass thereof by merely sliding or slipping along the screw or other device employed for the purpose.

In my co-pending application Serial No. 431,748, filed May 24, 1954, I describe and claim a process for the continuous removal of solids from a mixture thereof with vegetable juice which comprises adding a solid adsorbent filter aid to the mixture, and thereafter subjecting said mixture in a continuous stream to centrifugal force in a particular manner to separate the solids and the juice.

The present invention comprises an improvement over my prior invention whereby a substantially increased recovery of residual juice from the solids is obtained.

Further features of this invention will become apparent to persons skilled in the art as the specification proceeds and upon reference to the drawings in which:

Figure 2 is an elevation partly in section showing somewhat diagrammatically a centrifuge useful in the practice of the invention.

Figure 1:
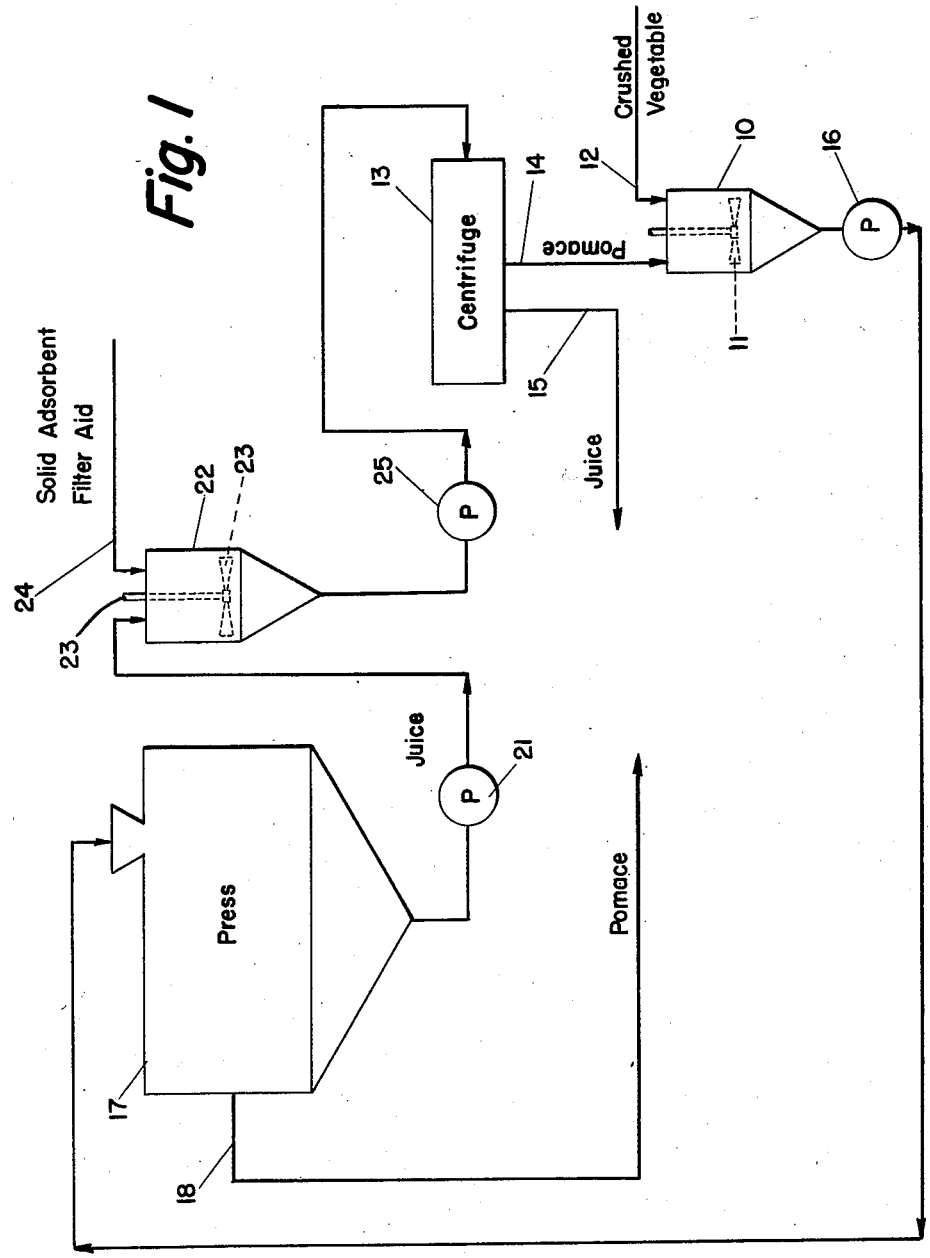
Figure 1 is a flow sheet illustrating an embodiment of the invention.

Referring more particularly to Figure 1, at 10 is shown a tank provided with an agitator 11. The feed of vegetables, preferably in crushed or disintegrated state, e. g., crushed grapes, into tank 10 is illustrated at 12, and the flow of pomace into tank 10 from centrifuge 13 is illustrated at 14.

The pomace or vegetable solids delivered to tank 10 from centrifuge 13 contains a solid absorbent filter aid as will be hereinafter more particularly described. This continuously flowing mass of pomace is the result of continuous centrifugal separation of solids from juice in centrifuge 13 to produce a final clarified juice of an acceptably low suspended solids content. This juice is illustrated as flowing from centrifuge 13 at 15.

The pomace from centrifuge 13 including the solid adsorbent filter aid is continuously mixed in tank 10, by means of agitator 11, with the crushed vegetable fed thereto. The mixture is continuously fed from tank 10, by means of pump 16, to press 17 wherein the mass is subjected to a continuous pressing operation.

Press 17 may be of any suitable design and construction of which a screw or expeller press is illustrative, and of which there are various different types available on the market. A screw press found to be particularly useful for the purpose is so designed as to initially apply a relatively light force and subsequently a relatively heavy force, and to cause the solids upon progressing through the press to slide in an axial direction without a large degree of rolling, grating or churning due to the rotation of the screw. In the operation of this type of press, the compressed continuously moving solids act as a filter bed through which the expressed juice passes with consequent substantially lower suspended solids content, although still far from sufficiently low to meet commercial standards. A press of this type is known in the trade as the "Garolla" press.

Due to the presence of the solid adsorbent filter aid in the continuously moving mass pressed in press 17, not only is the removal of suspended solids from the juice increased by virtue of its filtering action, but also is the degree of pressure which may be applied to the mass by virtue of the screw very substantially increased with the result that the residual juice content in the discharged pomace is reduced to an acceptably low figure. Pomace is illustrated as flowing from press 17 at 18.

Juice is pumped from press 17 by pump 21 and is delivered to tank 22 which is illustrated as having an agitator 23. Into tank 22 is introduced a solid adsorbent filter aid, e. g., alpha cellulose, as illustrated at 24.

The resulting mixture of juice and solid adsorbent filter aid is pumped from tank 22 by pump 25 to centrifuge 13 wherein, due to the centrifugal action and the presence of the solid adsorbent filter aid, the suspended solids are substantially completely removed from the juice. The juice is illustrated as flowing from centrifuge 13 at 15. The separated vegetable solids and filter aid flow as pomace from centrifuge 13 to tank 10 as previously described.

For convenience in the claims the term "pomace" is intended to mean an admixture of vegetable solids and solid adsorbent filter aid moistened by residual vegetable juice.

While centrifuge 13 may be of any desired design and construction capable of continuously removing from the juice suspended finely divided solids in the presence of adsorbent filter aid, and of continuously discharging the separated juice and separated solids containing the filter aid, a high degree of separation of suspended finely divided solids from the juice, and a relatively high degree of reduction of residual juice in the discharged solids, is attained when the centrifugal operation is carried out in a manner to continuously advance the separated layer of solids laterally or axially of the centrifuging zone in one direction while continuously advancing the liquid layer in an opposite direction through said centrifuging zone, and finally directing the continuously advancing layer of solids inwardly toward the axis of rotation to bring the solids layer out of contact with the liquid layer so as to continue the application of centrifugal force to said advancing solids layer to press or force additional liquid therefrom. A centrifuge for accomplishing this purpose is illustrated in Figure 2.

Referring now more particularly to Figure 2, the centrifuge 30 is of the scroll solids-discharge type. As shown, its rotor 31 is cylindrical in shape, and encloses an impeller member 32, which, as shown, comprises a continuous screw 33 attached along its inner helical edges to a supporting member 34, with its outer edge partly of cylindrical shape so as to conform to the shape of the inner surface or wall 35 of the rotor 31 as illustrated at 36, and partly of spiral shape, as illustrated at 37.

As illustrated, a pulley 49 is connected to the rotor 31, and both rotor 31 and impeller 32 are caused to rotate, but at a slightly different speed, such as at a difference of from 10 to 60 R. P. M., by virtue of being interconnected through a planetary gear box 38, the design, construction, operation and function of which are well known in centrifuges of this type. As illustrated, the casing of gear box 38 is connected to rotor 31, and a driving connection between gear box 38 and member 34 is accomplished through shaft 39 which extends from the interior of the gear box 38, and connects with member 34, in a well known manner. In couplings of this type it is customary to hold a sun gear (not shown) in gear box 38 stationary. This is accomplished in the usual manner by mounting the sun gear on a shaft 60 held stationary by mounting it in a bracket 61 and securing the shaft 60 by a screw 62. Any other suitable coupling between the rotor 31 and the impeller member 32 to effect relative rotation therebetween may be substituted, as is well understood in the art. Then too, as is also well known, rotor 31 and member 34 may be separately driven, but at slightly different speeds. 40 and 40' are pillow blocks containing bearings in which extensions on rotor 31 rotate. 57 and 58 are bearings between rotor 31 and member 34. 59 is a thrust bearing for member 34.

The mixture of juice containing finely divided solids and of solid adsorbent filter aid flowing from tank 22 (Figure 1) is fed into the rotor 31 (Figure 2) through a conduit 41, and reaches a chamber 42 inside of the member 34. It then passes into the zone of centrifugation, situated between the member 34 and the inner wall 35 of the rotor 31, through a plurality of channels 43 in the member 34. Due to centrifugal force generated by the rapid rotation of the rotor 31 and associated parts, and the relative rotational movement of the screw 33 with respect to the rotor 31, solids including adsorbent filter aid is sedimented on to the inner wall 35 of rotor 31, and are moved to the right as seen in Fig. 2.

In the particular centrifuge shown in Figure 2, portion 36 of screw 33 coacts with the inner wall 35 of rotor 31 in causing movement of solids, whereas the portion 37 of screw 33 permits solids to build up on the inner wall 35, and coacts with such built-up solids by forming an inner surface thereon over which additionally separated solids are propelled in completing their movement to the right as seen in Figure 2. I prefer, however, to fill the annular space normally occupied by such built-up solids with an annular filler ring as illustrated in dotted lines at 50. The inner surface of filler ring 50, when employed, is preferably provided with grooves extending from left to right as seen in Figure 2, which grooves serve to reduce or prevent any tendency of the solids flowing toward solids-discharge ports 44 to roll, grate or churn due to the relative rotation of screw 33 with respect to rotor 31.

The separated solids in completing their movement to the right as seen in Figure 2, whether sliding over built-up solids or over filler ring 50, are conveyed radially inward out of the level of the juice in the zone of centrifugation, while continuing to be subjected to centrifugal force, to separate juice therefrom, the juice thus separated flowing back into the main zone of centrifugation, and the solids are then discharged from the rotor 31 through ports 44, each of the same radial distance from the axis of rotation, and of which there may be any desired number.

It will be noted that the inlets 46 of ports 44 are closer to the axis of rotation than the ports 45, which causes the separated juice to be discharged through ports 45 instead of through ports 44.

In the usual commercial embodiments of centrifuges of this type, discharge ports 45, or their equivalent, are made radially adjustable to increase or decrease their distance from the axis of rotation, as desired. This decreases and increases respectively the depth of the juice layer in the rotor 31, but in no event is the depth of the juice layer increased to the point where juice would be discharged from the rotor through the ports 44.

Solids discharged from the rotor 31 are collected in section 51 of rotor housing 52, and are removed through hopper 53 at the bottom of section 51.

Juice discharged from the rotor 31 through the ports 45 is collected in a section 54 of the housing 52, and is removed through hopper 55 at the bottom of section 54.

As is well known, screw 33 may be either right-hand or left-hand in shape, that is, it may advance along member 34 either clockwise or counter-clockwise, and/or it may, through its coupling to rotor 31, rotate either faster or slower than the rotor 31. Furthermore, screw 33 and rotor 31 may rotate together in either direction, that is, either clockwise or counter-clockwise, as seen from the gear box 38. However, the shape of screw 33 and its relative rotation with respect to rotor 31, by virtue of the characteristics of the coupling employed between screw 33 and rotor 31, are coordinated so as to impel the separated solids in the zone of centrifugation to the right as seen in Figure 2, that is toward the discharge ports 44.

Any other centrifuge construction employing a solids impeller member and operating on a similar principle may be substituted. A typical and well known commercial centrifuge, otherwise constructed like the one above described, employs a conical rotor and a spiral screw conforming to the shape of the inner wall of the conical rotor with which it coacts throughout substantially its entire length to impel separated solids, similar to the coaction of section 36 of screw 33 with the inner wall 35 of rotor 31.

The feed admixture to the centrifuge should be in flowable form so that it may traverse the conduit 41. Slurries containing as high as 25 to 30% undissolved solids (including adsorbent filter aid) may be processed without difficulty, depending somewhat upon the size and design of the centrifuge, and higher solids content in the slurries are permissible, but preferably such slurries are pumpable. Normally the percentage total of naturally occurring undissolved solids plus adsorbent filter aid in the mixtures to be separated in the centrifuge fall far below the percentages above given, such as between 0.5% and 15%, by weight. If desired for any reason, water may be added to the feed mixture to adjust its percentage of solids content, although I prefer to separate vegetable juices in their naturally occurring state without dilution.

By the addition of a small amount of solid filter aid having adsorbent properties to the mixture of juice and solids fed to the centrifuge, I am able to obtain not only a highly satisfactory clarification of the juice by the removal of residual finely divided solids therefrom, but also a degree of removal of juice from the solids separated in the centrifuge sufficient to produce a pomace containing adsorbent filter aid highly satisfactory for admixture with the crushed vegetable feed, and for subsequent pressing therewith in the press 17, the adsorbent filter aid containing pomace increasing the efficiency of the press to a surprising degree. Moreover, a large part of the residual juice in this pomace is recovered in press 17 to produce a final total pomace of relatively very low residual juice content.

When, for example, from 0.1% to 2% by weight of adsorbent filter aid, based on the weight of the juice fed to tank 22, is added to said juice, such as prior to or during feeding of the mixture into the zone of centrifugation, a markedly increased improvement is obtained, not only in the degree of clarification of the final separated juice, but also in the reduction of the juice content of the final pomace. The exact amount of adsorbent filter aid employed is not critical, an improvement being obtained with a small amount, and such improvement increases as more is added up to an optimum and more does no harm. The percentage of adsorbent filter aid at the optimum obviously will vary somewhat, not only between various adsorbent filter aids but also between various mixtures of juices and solids to be separated. Thus reference to from 0.1% to 2% by weight of the juice is by way of illustration, and more may be added if desired for any reason, such as up to 5% by weight or even 10% by weight. An extremely surprising fact is that usually only a relatively small amount of adsorbent filter aid is required even for best results. Moreover, despite differences in density of filter aid materials generally, an improvement is obtained in all instances by merely adding 0.1% by weight.

Examples of vegetables to which my invention may be applied are as follows:

Crushed juice-bearing fruits having skins, such as crushed grapes, tomatoes, peaches, apricots, pears, apples, cherries, plums and persimmons.

Crushed juice-bearing meats of fruits having rinds, usually after removal of the rinds, such as oranges, lemons, pineapples, tangerines, grapefruit, melons, and papaya.

Crushed juice-bearing berries, such as strawberries, raspberries, blackberries, gooseberries, blueberries, currants, elderberries and cranberries.

Crushed juice-bearing garden vegetables, such as celery, carrots, beets, sugar cane, asparagus, spinach and turnips.

The following example of the operation of my new process is given by way of illustration and not of limitation.

*Example 1*

For purposes of starting up the process, crushed, stemmed, and depectinized grapes to which approximately 0.5% of alpha cellulose, based on the weight of the grapes, had been added, were fed directly to press 17 at a rate of approximately 10 tons per hour. The effluent juice which contained on an average between 6 and 8% by volume of finely divided solids, was continuously fed to tank 22, at which point approximately 0.6% of alpha cellulose, based on the weight of the juice, was added thereto, and the mixture agitated. The resultant mixture was pumped at a rate of approximately 2000 gallons per hour (the rate at which juice was expelled at press 17) to centrifuge 13 which was of the design and construction shown in Figure 2. The juice delivered at 15 from centrifuge 13 contained less than 1.5% by volume of suspended solid matter which represents a degree of clarification highly acceptable in the trade.

The pomace delivered at 14 from centrifuge 13 contained on an average between 65% and 70% of moisture by weight. This pomace was mixed with crushed, stemmed and depectinized grapes at a temperature of approximately 135° F. and at a rate of approximately 1.8% based on the weight of said grapes. The initial feeding of the mixture of grapes and alpha cellulose to press 17 was now stopped, and the mixture of pomace and grapes was now fed thereto from tank 10 at the rate of approximately 10 tons per hour, the expelled juice continuing to flow to tank 22 as previously described.

When the process leveled off at equilibrium as the result of the continuous feeding and flows referred to above, the effluent juice flowing from centrifuge 13 at 15 still contained less than 1.5% by volume of suspended finely divided solids, and the pomace leaving press 17 at 18 averaged less than 40% moisture by weight, which is a very satisfactory figure in the trade.

The volumetric determinations of the insoluble solid content of the juice were carried out in the customary manner, namely, by centrifuging a sample in a bottle centrifuge operating at 1500 R. P. M., the distance from the axis of rotation to the bottom of the bottle being 6 inches.

The determination of the moisture content of the pomace was carried out in the following manner: A sample is weighed and then dried in an oven for 16 hours at 105° C. The sample is then cooled and reweighed. The percentage loss in weight of the original sample is reported as the moisture content of the original sample.

Any other vegetable and/or any other solid adsorbent filter aid known in the art, may be substituted in the above example with the improved results to which this invention is directed.

The action of the adsorbent filter aid is physical in character, and such aids are preferably chemically inert in the system, i. e., to the materials being processed. Examples of other solid filter aids having adsorbent properties are any of the aids of the diatomite type, kieselguhr, tripolite, and infusorial earth being other names applied; any of the clays having such properties, such as fuller's earth, kaolin, bentonite, and aluminum silicate; and alumina or bauxite. Such aids are, of course, of higher density than the juice. A source of alpha cellulose is the product sold under the trade-mark "Solka-Flor."

My process may be practiced over wide conditions of temperature, such as room temperature or above or below. Elevated temperatures are frequently employed to impart fluidity to the mass, to assist in expelling juice, and to reduce the viscosity of the juice. These factors are well understood in the centrifugal processing art, but irrespective of the particular temperature conditions employed which, in any event, are subject to the choice and judgment of the operator, the use of my invention will yield improved results over those obtained when it is omitted. Generally speaking, temperature conditions in excess of the boiling point of water, namely, 212° F., are rarely employed, as are temperature conditions below 25° F. More commonly, temperature conditions between 75° F. and 180° F. are employed.

I do not find that pressure conditions are critical in the operation of my process, and any desired pressure may be employed at any point with the improved results to which this invention is directed. The presence in press 17 of the pomace discharged from centrifuge 13 increases to a surprising degree the pressure which may be applied on the solid mass continuously moving through press 17 with resultant lower moisture content in the pomace discharged therefrom, and this result is attained not only without an increase in the solid content of the expelled juice over that normally obtained at the lower limiting pressures in the absence of the pomace, but actually with a very considerable decrease in the solid content of the expelled juice, which fact greatly simplifies the centrifuging operation at centrifuge 13. Therefore, while I prefer to operate with the maximum reasonable pressures on the solids in press 17, depending, of course, on the strength and capabilities of the press employed, to reduce the moisture content of the final total pomace to a highly acceptable degree, and with a centrifugal force at centrifuge 13 sufficient to reduce the solids content of the juice to a point of highest acceptance in the trade, it is obvious that my new process may be employed with resultant advantages in the meeting of lower standards and without departing from the spirit of the invention.

The centrifuge employed in the above example had an interior diameter of 14 inches, an interior length of 22 inches, and was operated at 4000 R. P. M. The construction, operation and capabilities of continuous presses, such as screw or expeller presses, are well known in the art.

Although my invention is especially adapted to the processing of vegetables having juices which are non-oleaginous in character, e. g., juices which are comprised substantially entirely of aqueous solutions of vegetable solubles, it may be applied to the processing of vegetables containing both aqueous juices and oil, such as crushed olives, or cocoanut meats.

Having more particularly described my invention, it is to be understood that this is by way of illustration, and that changes, omissions, additions, substitutions, and/or modifications may be made without departing from the spirit thereof. Accordingly, it is intended that the patent shall cover by suitable expression in the claims the various features of patentable novelty that reside in the invention.

I claim:

1. A process for the production of juice from a vegetable that contains juice which is comprised preponderantly of an aqueous solution of vegetable solubles which comprises admixing said vegetable with pomace produced in a succeeding step in said process, pressing the resulting admixture to expel juice from said vegetable, said expelled juice containing solid matter, admixing a solid adsorbent filter aid with said latter juice, centrifuging the admixture resulting from said last-mentioned admixing to separate the juice from the pomace of said last-mentioned admixture, and employing said last-mentioned pomace as the source of said first-mentioned pomace.

2. The process of claim 1 in which the vegetable comprises crushed fruit.

3. The process of claim 2 in which the fruit comprises depectinized grapes.

4. The process of claim 1 in which the solid adsorbent filter aid comprises alpha cellulose.

5. The process of claim 1 in which the steps are carried out continuously in unbroken continuity.

6. The process of claim 5 in which the vegetable is depectinized crushed grapes, and in which the solid adsorbent filter aid comprises alpha cellulose.

7. The process of claim 1 in which the centrifuging is carried out by subjecting a continuous stream of the admixture of juice and solid adsorbent filter aid to a centrifugal force sufficient to separate into layers by subsidence the solids and the juice, by continuously advancing the layer of solids laterally of the centrifuging zone in one direction while continuously advancing the layer of juice in an opposite direction through said centrifuging zone, by eventually moving said continuously advancing layer of solids inwardly toward the axis of rotation to bring it out of contact with said layer of juice, by thereafter continuing the application of centrifugal force to said advancing layer of solids, to separate juice therefrom, said separated juice moving in an opposite direction to said solids and back into the main zone of centrifugation, by continuously and separately discharging the final separated solids from the centrifuging zone, and by continuously and separately discharging the final separated juice from the centrifuging zone.

References Cited in the file of this patent

UNITED STATES PATENTS

| | | |
|---|---|---|
| 1,297,635 | Ayers | Mar. 18, 1919 |
| 1,985,426 | Ragsdale | Dec. 25, 1934 |
| 2,128,432 | Ramage | Aug. 30, 1938 |
| 2,703,676 | Gooch | Mar. 8, 1955 |